(12) United States Patent
Stone et al.

(10) Patent No.: US 7,322,159 B2
(45) Date of Patent: Jan. 29, 2008

(54) FLOOR PLANK

(75) Inventors: Norman Stone, Harrison, NY (US);
Song Zhengxing, Zhangjiagang (CN)

(73) Assignee: Tru Woods Limited, Hong Kong (CN)

( * ) Notice: Subject to any disclaimer, the term of this patent is extended or adjusted under 35 U.S.C. 154(b) by 0 days.

(21) Appl. No.: 11/545,834

(22) Filed: Oct. 11, 2006

(65) Prior Publication Data
US 2007/0175137 A1 Aug. 2, 2007

Related U.S. Application Data

(62) Division of application No. 11/321,015, filed on Dec. 29, 2005, now Pat. No. 7,155,871.

(51) Int. Cl.
*E04B 1/00* (2006.01)
*E04G 21/00* (2006.01)
*E04G 23/00* (2006.01)

(52) U.S. Cl. .............. 52/741.3; 52/591.4; 52/609; 52/611; 52/451; 52/462

(58) Field of Classification Search ........... 52/591.4, 52/403.1, 391, 392, 451, 454, 462, 420, 416, 52/741.3; 428/40.1, 42.3, 40.4, 60, 54, 157; 156/289, 247, 249, 543
See application file for complete search history.

(56) References Cited

U.S. PATENT DOCUMENTS

| | | | |
|---|---|---|---|
| 1,978,075 A | | 10/1934 | Butterworth |
| 2,189,218 A | | 2/1940 | Neumiester |
| 2,284,705 A | * | 6/1942 | Wickersham ............... 52/105 |
| 2,390,697 A | * | 12/1945 | Eason ......................... 52/420 |
| 2,914,815 A | | 12/1959 | Alexander |
| 3,247,638 A | | 4/1966 | Gay |
| 3,434,259 A | * | 3/1969 | Corbin ......................... 52/420 |
| 3,554,850 A | | 1/1971 | Kuhle |
| 3,657,852 A | | 4/1972 | Worthington et al. |
| 3,859,000 A | | 1/1975 | Webster |
| 3,988,187 A | | 10/1976 | Witt et al. |
| 4,090,338 A | | 5/1978 | Bourgade |
| 4,426,820 A | | 1/1984 | Terbrack et al. |
| 4,644,720 A | | 2/1987 | Schneider |
| 5,111,630 A | | 5/1992 | Munsey et al. |

(Continued)

FOREIGN PATENT DOCUMENTS

CA 2 468 532 6/2003

(Continued)

*Primary Examiner*—Richard E. Chilcot, Jr.
*Assistant Examiner*—Chi Q. Nguyen
(74) *Attorney, Agent, or Firm*—Rodman & Rodman

(57) ABSTRACT

The floor plank is a laminate of two layers of flexible plastic sheet material laminated together in offset relationship to define an offset marginal portion for each of the layers. Each of the offset marginal portions have oppositely facing adhesive coated surfaces. A foam layer and/or a fiberglass sheet can also be included in the laminate structure of the floor plank. The floor plank can conform to surface contours of a floor base. The bottom layer of the floor plank, whether it is plastic sheet or foam, is conformable to surface irregularities of the floor base. A one piece releasable packaging device covers the oppositely facing adhesive coated surfaces of the offset marginal portions.

5 Claims, 8 Drawing Sheets

U.S. PATENT DOCUMENTS

| | | | |
|---|---|---|---|
| 5,179,812 A | 1/1993 | Hill | |
| 5,304,272 A * | 4/1994 | Rohrbacker et al. | 156/209 |
| 5,404,686 A | 4/1995 | Esposito | |
| 5,417,026 A | 5/1995 | Brumfield | |
| 5,711,128 A | 1/1998 | Kordelin | |
| 5,837,375 A * | 11/1998 | Brault et al. | 428/32.24 |
| 5,916,654 A * | 6/1999 | Phillips et al. | 428/42.2 |
| 6,029,416 A | 2/2000 | Andersson | |
| 6,119,423 A | 9/2000 | Costantino | |
| 6,156,402 A | 12/2000 | Smith | |
| 6,235,365 B1 * | 5/2001 | Schaughency et al. | 428/40.1 |
| 6,511,257 B1 * | 1/2003 | Seaux et al. | 404/34 |
| 6,591,568 B1 | 7/2003 | Palsson | |
| 6,601,359 B2 | 8/2003 | Olafsson | |
| 6,647,690 B1 | 11/2003 | Martensson | |
| 6,656,557 B2 * | 12/2003 | Phillips | 428/40.3 |
| 6,659,097 B1 * | 12/2003 | Houston | 125/12 |
| 6,691,480 B2 | 2/2004 | Garcia | |
| 6,695,527 B2 * | 2/2004 | Seaux et al. | 404/34 |
| 6,751,917 B2 | 6/2004 | Mao | |
| 6,769,218 B2 | 8/2004 | Pervan | |
| 6,786,019 B2 | 9/2004 | Thiers | |
| 6,794,001 B2 | 9/2004 | Chen et al. | |
| 6,823,638 B2 | 11/2004 | Stanchfield | |

FOREIGN PATENT DOCUMENTS

| | | |
|---|---|---|
| DE | 202 14 720 U1 | 1/2003 |
| DE | 203 07 987 U1 | 10/2004 |

* cited by examiner

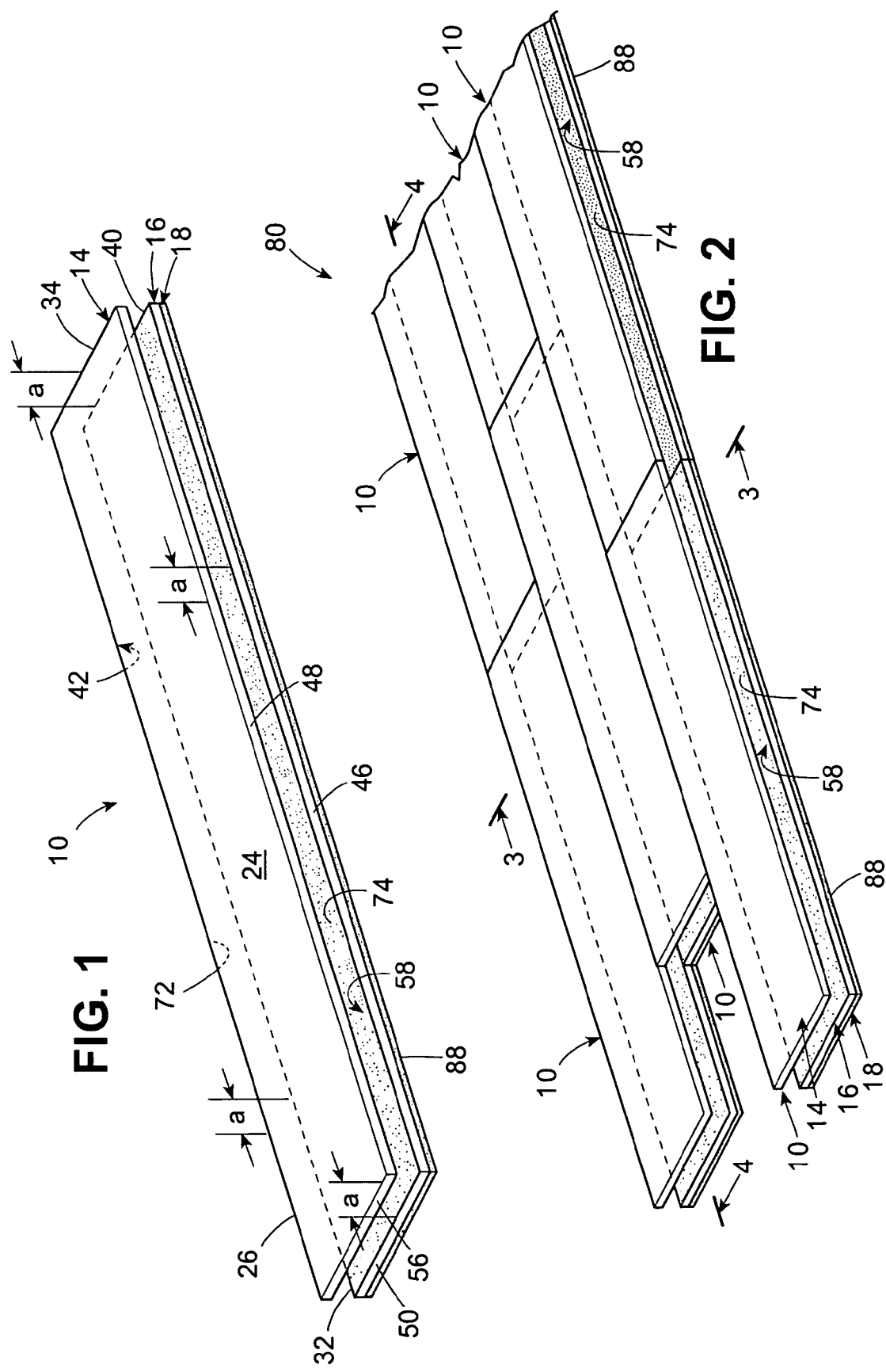

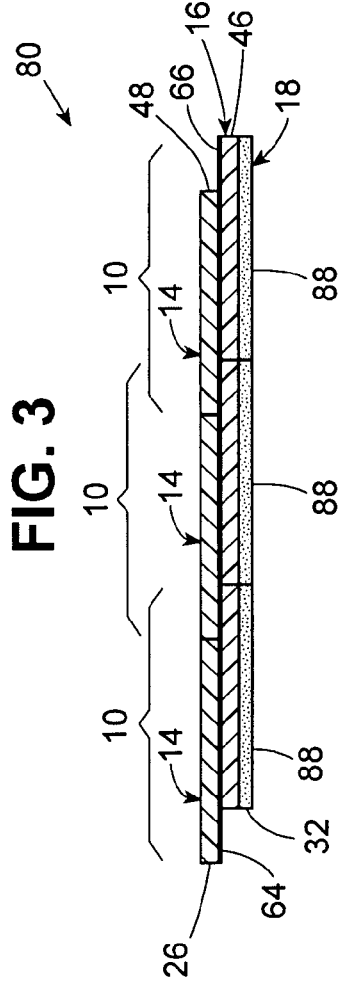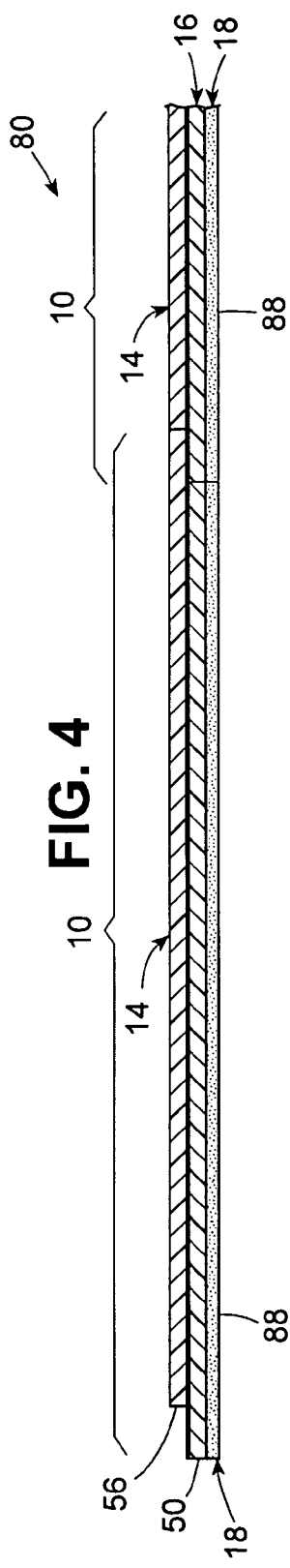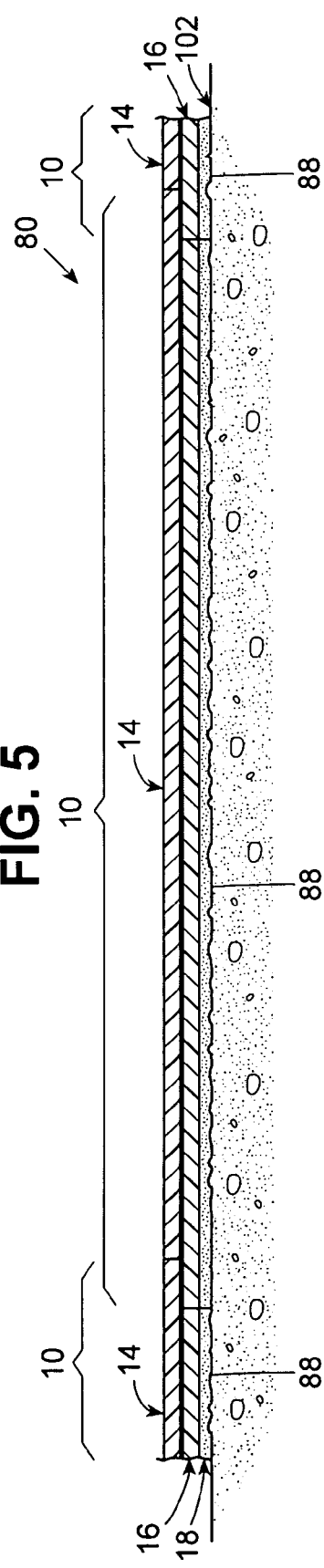

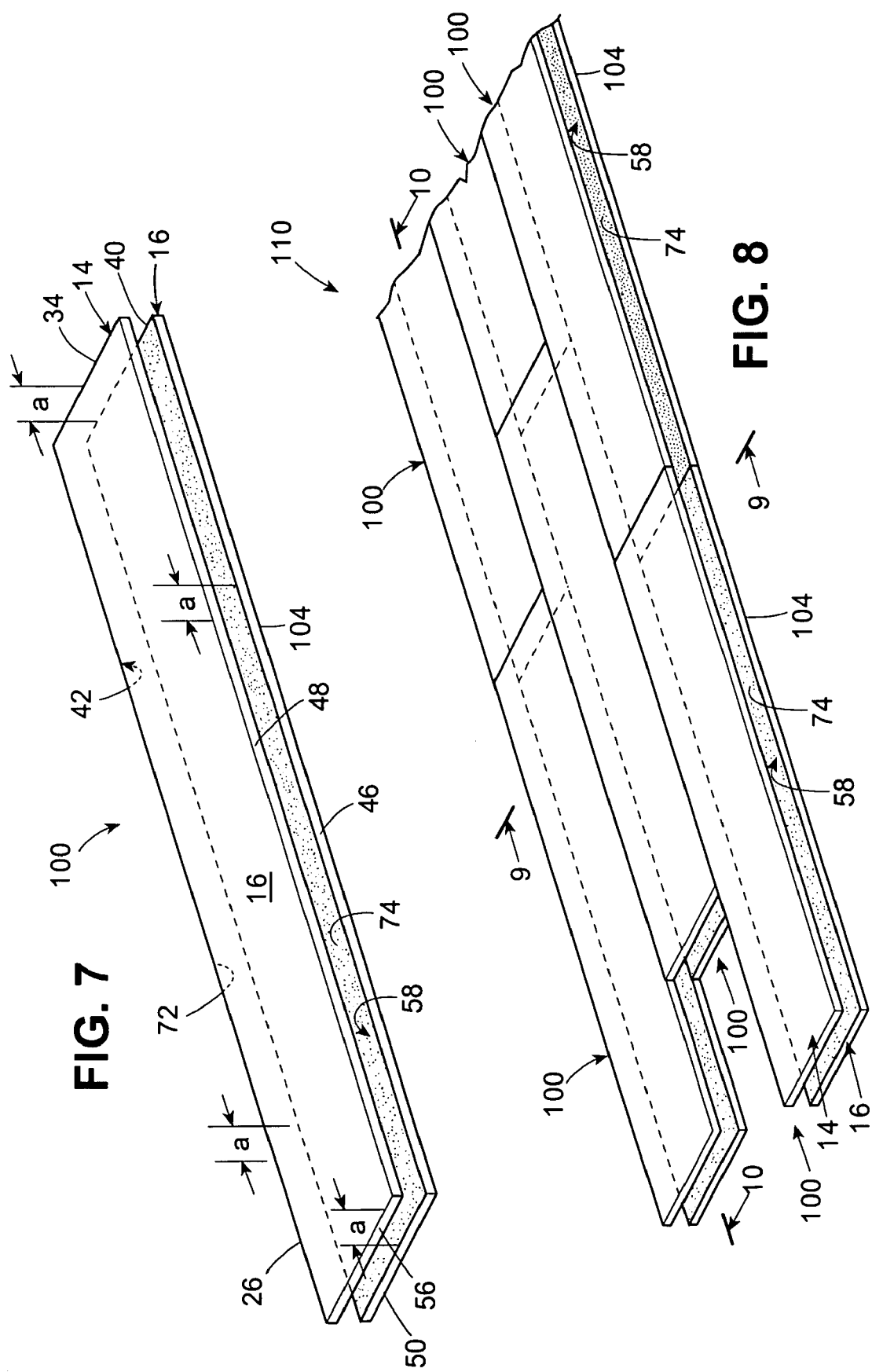

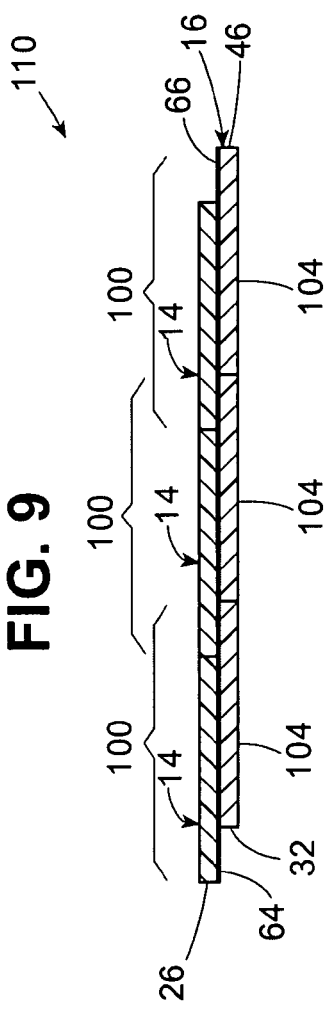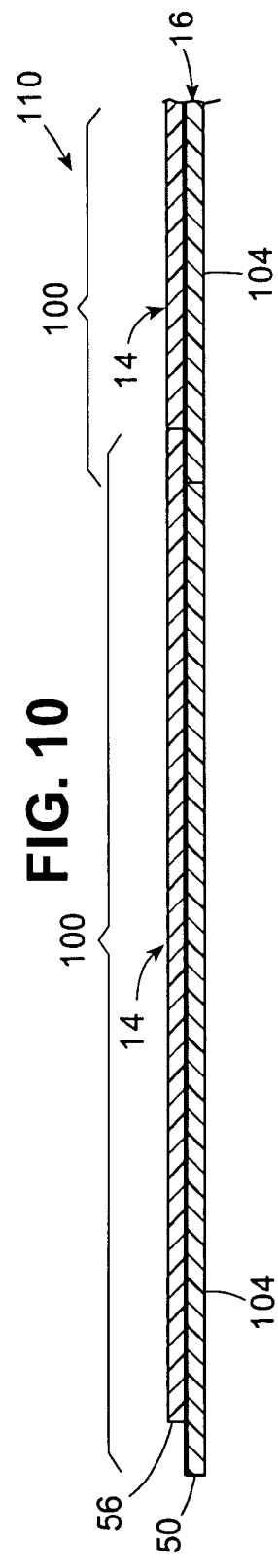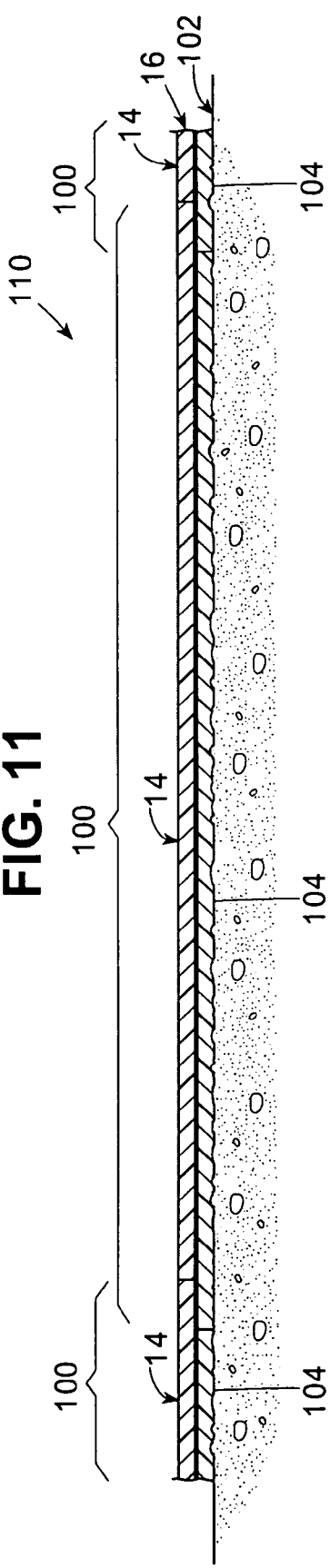

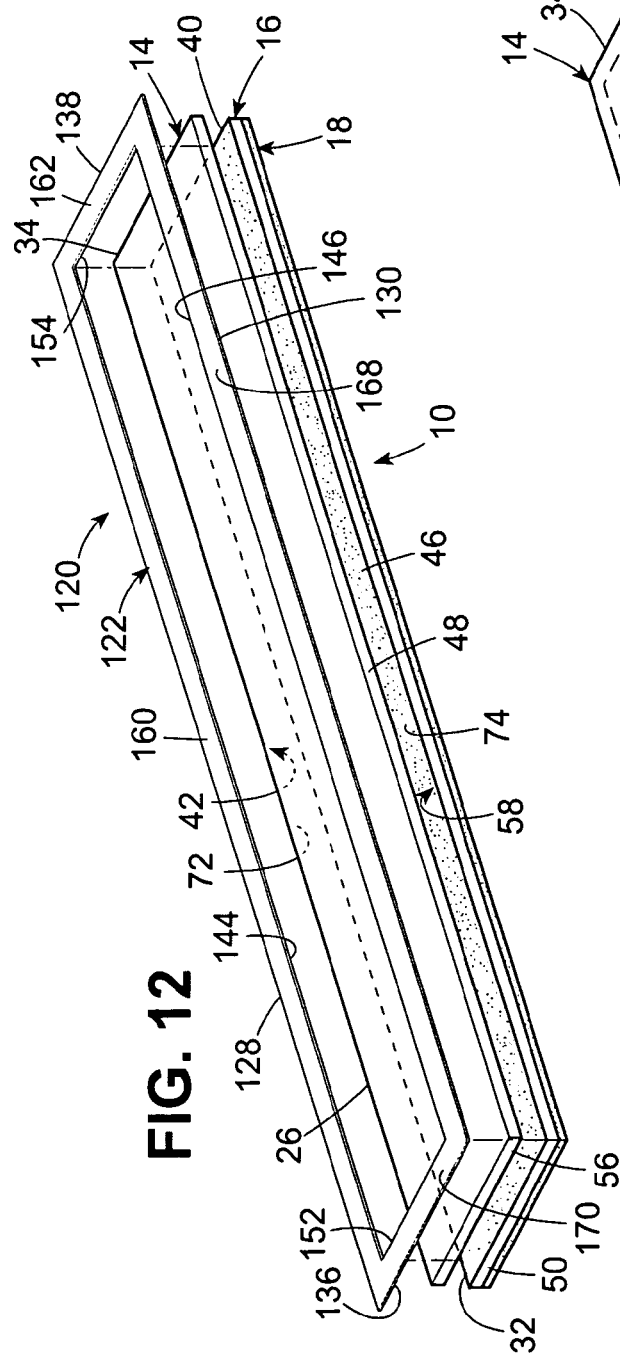
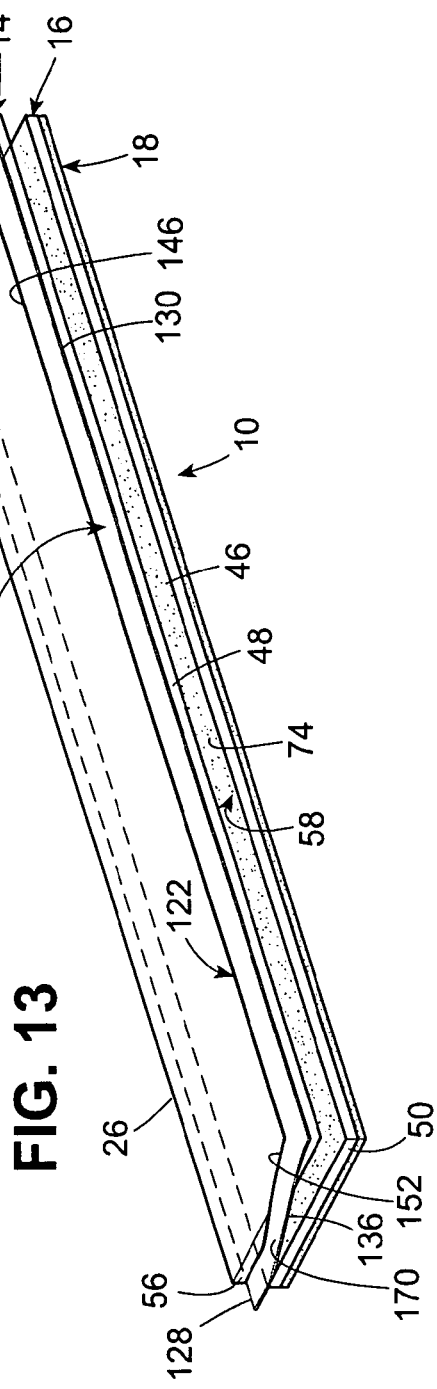
FIG. 12
FIG. 13

FLOOR PLANK

CROSS REFERENCE TO RELATED APPLICATION

This application is a divisional of application Ser. No. 11/321,015 filed Dec. 29, 2005.

BACKGROUND OF THE INVENTION

1. Field of the Invention

This invention relates to a floor plank that can be installed on a floor base without being bonded to the floor base, and more particularly, to a flexible floor plank that is securable to similar adjacent floor planks on a floor base and is conformable to surface contours and surface irregularities of the floor base. The invention also relates to a packaging system for the floor plank.

2. Related Prior Art

U.S. Pat. No. 1,978,075 to Butterworth discloses a wood block flooring with a tongue and groove engagement system for securement of similar blocks in side-by-side relationship. Since the blocks are formed of wood they are generally rigid and inflexible, and do not easily conform to surface contours and surface irregularities of a floor base. The woodblocks are also secured to a floor base using mastic or nailing.

U.S. Pat. No. 2,914,815 to Alexander shows an interlocked flooring system wherein individual blocks have offset base members formed of plywood. The plywood base members are laminated to the blocks and permit securement of similar blocks in side-by-side arrangement. The plywood base members are also generally rigid and inflexible. Thus the blocks do not easily conform to surface contours and surface irregularities of a floor base.

U.S. Pat. No. 3,554,850 to Kuhle shows parquet flooring with projecting parts for side-by-side securement of similar parquet sections. The parquet flooring is generally rigid and inflexible and thus cannot easily conform to surface contours and surface irregularities of a floor base.

DESCRIPTION OF THE DRAWINGS

In the accompanying drawings,

FIG. 1 is a perspective view of a floor plank incorporating one embodiment of the present invention;

FIG. 2 is a perspective view of an assembly pattern thereof;

FIG. 3 is a sectional view taken on the line 3-3 of FIG. 2;

FIG. 4 is a sectional view taken on the line 4-4 of FIG. 2;

FIG. 5 is a sectional view thereof on a floor base;

FIG. 7 is a perspective view of a floor plank incorporating another embodiment of the invention;

FIG. 8 is a perspective view of an assembly pattern thereof;

FIG. 9 is a sectional view taken on the line 9-9 of FIG. 8;

FIG. 10 is a sectional view taken on the line 10-10 of FIG. 8;

FIG. 11 is a sectional view thereof on a floor base;

FIGS. 12-14 are perspective views of a packaging system for the floor plank incorporating another embodiment of the invention, before, during and after installation in a floor plank;

Corresponding reference numbers indicate corresponding parts throughout the several views of the drawings.

DETAILED DESCRIPTION OF THE INVENTION

Figure 6:
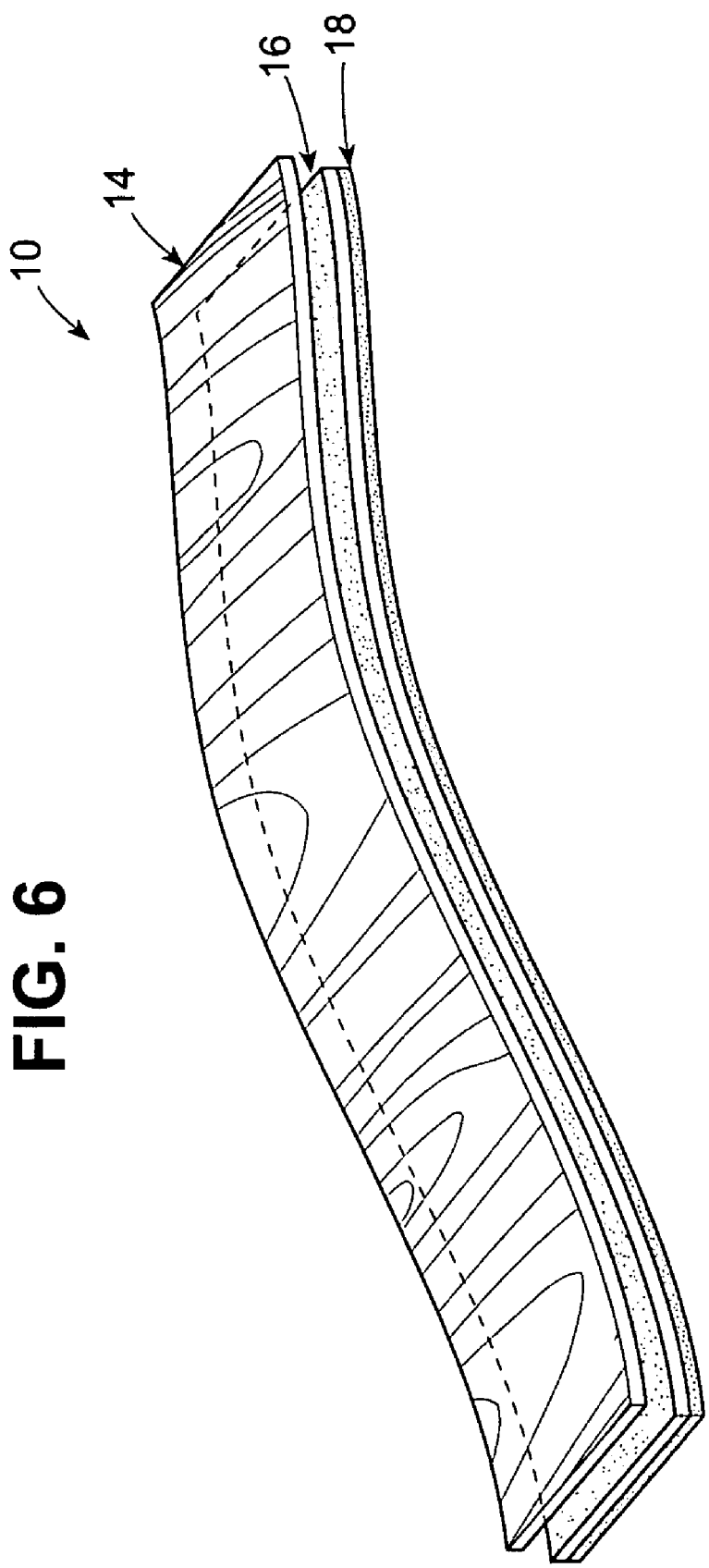
FIG. 6 is a perspective view showing the flexibility characteristics of the floor plank.

Referring to the drawings, a floor plank incorporating a preferred embodiment of the invention is generally indicated by the reference number 10 in FIG. 1.

The floor plank 10 is a laminate of a top layer 14 of flexible plastic sheet material, a middle layer 16 of flexible plastic sheet material and a bottom layer 18 of flexible foam material. All of the layers 14, 16 and 18 are of identical polygonal size and shape, preferably rectangular.

The top layer 14 and the middle layer 16 are preferably formed of a synthetic plastic material, preferably a vinyl plastic material such as polyvinyl chloride sheeting material. An upper surface 24 of the top layer 14 is provided with a design such as a synthetic wood grain design (FIG. 6) that resembles natural wood. The bottom layer 18 is formed of a soft flexible foam material such as polyurethane foam.

The middle plastic layer 16 and bottom foam layer 18 are laminated together such that they are coextensive and have a common periphery. However the top plastic layer 14 is laminated to the middle plastic layer 16 such that the top layer 14 is offset from the middle layer 16.

In the offset layer arrangement a long edge 26 (FIG. 1) of the top layer 14 extends an offset amount "a" beyond a long edge 32 of the middle layer 16 and a short edge 34 of the top layer 14 extends an offset amount "a" beyond a short edge 40 of the middle layer 16 to define an offset L-shaped marginal section 42 of the top layer 14.

Also in the offset layer arrangement a long edge 46 (FIG. 1) of the middle layer 16 extends an offset amount "a" beyond a long edge 48 of the top layer 14, and a short edge 50 of the middle layer 16 extends an offset amount "a" beyond a short edge 56 of the top layer 14 to define an offset L-shaped marginal section 58 of the middle layer 16.

The L-shaped marginal section 42 of the top layer 14 and the L-shaped marginal section 58 of the middle layer 16 are of identical size and shape.

A suitable bonding or adhesive composition for laminating the top plastic layer 14 and middle plastic layer 16 together has the following components, the amounts of which are approximate:

a) 35% SIS (styrene-isoprene-styrene elastomer)
b) 54.5% petroleum resin
c) 10% mineral oil
d) 0.05% oxidation resistant BHT (2,6-di-tert-butyl-p-cresol)

The bonding material for the layers 14 and 16 is provided on a lower surface 64 (FIG. 3) of the top plastic layer 14 and on an upper surface 66 of the middle plastic layer 16.

The same bonding material applied to the lower surface 64 and the upper surface 66 for laminating top plastic layer 14 and the middle plastic layer 16 can also be used for laminating the bottom foam layer 18 to the middle plastic layer 16.

The L-shaped marginal section 42 has a downwardly directed adhesive surface 72 (FIG. 1) that is part of the lower surface 64 (FIG. 3) of the top layer 14 and the L-shaped marginal section 58 has an upwardly directed adhesive surface 74 (FIG. 1) that is part of the upper surface 66 (FIG. 3) of the middle layer 16. The adhesive on the exposed adhesive surfaces 72 and 74 is the bonding material used for laminating the top plastic layer 14 and the middle plastic layer 16 together.

Although the dimensions of the floor plank 10 are a matter of choice, a suitable size for the top layer 14, the middle layer 16 and the bottom layer 18 can be for example, 6 inches by 48 inches. The thickness of the top layer 14 can be, for example, approximately 2.0 mm and the thickness of the middle layer 16 can be, for example, approximately 2.5 mm. The thickness of the bottom foam layer 18 can be, for example, approximately 3 mm. The marginal offset "a" can be, for example, approximately ¾ of an inch. Larger offsets would be provided for larger panels.

The floor plank 10 is sufficiently flexible as schematically indicated in FIG. 6, to conform to typical variations in surface contour of a floor base 102 (FIG. 5) upon which the floor plank 10 is laid. In addition, the flexible foam material of the bottom layer 18 is yieldable to small bumps and other imperfections in the floor base 102 generally referred to as surface irregularities. The bottom foam layer 18 thus enables the floor plank 10 to conform to such surface irregularities and lie flat on the floor base 102.

During installation of the floor planks 10 in side-by-side and end-to-end relationship, the downwardly directed adhesive surface 72 (FIG. 1) of the L-shaped marginal section 42 of the top layer 14 is positioned to engage the upwardly directed adhesive surface 74 of the L-shaped marginal section 58 of the middle layer 16 to form the assembly 80 of the floor planks 10 as shown in FIG. 2. When placing two of the planks 10 together, one of the planks 10 can be angled at approximately 45 degrees (not shown) with respect to the floor base 102 and onto the corresponding upwardly facing adhesive surface 74 (FIG. 1) of an adjacent floor plank 10.

The floor plank assembly pattern 80 (FIG. 2) is but one example of numerous possible plank patterns known in the art.

The floor planks 10 can be installed on the floor base 102 (FIG. 5) without mastic or an adhesive coating on the floor base 102, and without mastic or adhesive on an undersurface 88 (FIG. 3) of the bottom foam layer 18. Thus during installation, the floor planks 10 can be placed on a dry floor base surface 102 for easy shifting to any selected position, thereby facilitating installation of the floor planks 10 in any desired pattern.

Preferably the installation of floor planks 10 should start in a corner of a room (not shown) and proceed outwardly therefrom. An expansion gap of ¼ inch for example, from each wall is generally suitable for most installations. The expansion gap is usually covered by molding. It has also been found helpful to provide double faced tape on the first row of floor planks 10 to help maintain the first row in place during the positioning of adjacent floor planks 10.

The top layer 14, the middle layer 16 and the bottom layer 18 of the floor plank 10 are provided with an overall thickness that enables the floor plank 10 to be easily cut with a utility knife, if trimming is needed. Ease of trimming the floor plank 10 and the mastic free placement of the planks 10 on a floor base 102 make it convenient for a do-it-yourselfer to install the floor planks 10.

Another embodiment of the floor plank is generally indicated by the reference number 100 in FIG. 7.

The floor plank 100 is a laminate of the top layer 14 and the middle layer 16 of the floor plank 10, with the bottom foam layer 18 being omitted. The layers 14 and 16 are laminated together with marginal offsets "a" as previously described with respect to the floor plank 10.

The floor plank 100 thus includes identical L-shaped marginal sections 42 and 58 with identical offsets "a".

In installing the floor plank 100 on a floor base 102 (FIG. 11), a lower surface 104 of the layer 16 can be free of any mastic or adhesive covering and placed in direct contact with the floor base 102. The floor base 102 can also remain free of any mastic or adhesive covering. Installation of the floor planks 100 in a plank assembly pattern 10 (FIG. 8) is accomplished in a manner similar to that previously described for the installation of the floor plank 10 in the plank assembly pattern 80 (FIG. 2).

The lower surface 104 (FIGS. 7 and 8) of the layer 16 which contacts the floor base 102 (FIG. 11) is yieldable to surface irregularities of the floor base 102 and thus enables the floor plank 100 to conform to such surface irregularities and lie flat on the floor base 102, as shown in FIG. 11.

A packaging system for the floor plank is generally indicated by the reference number 120 in FIG. 12.

The packaging system 120 will be described in connection with the floor plank 10 but is equally applicable to the floor plank 100.

Figure 15:
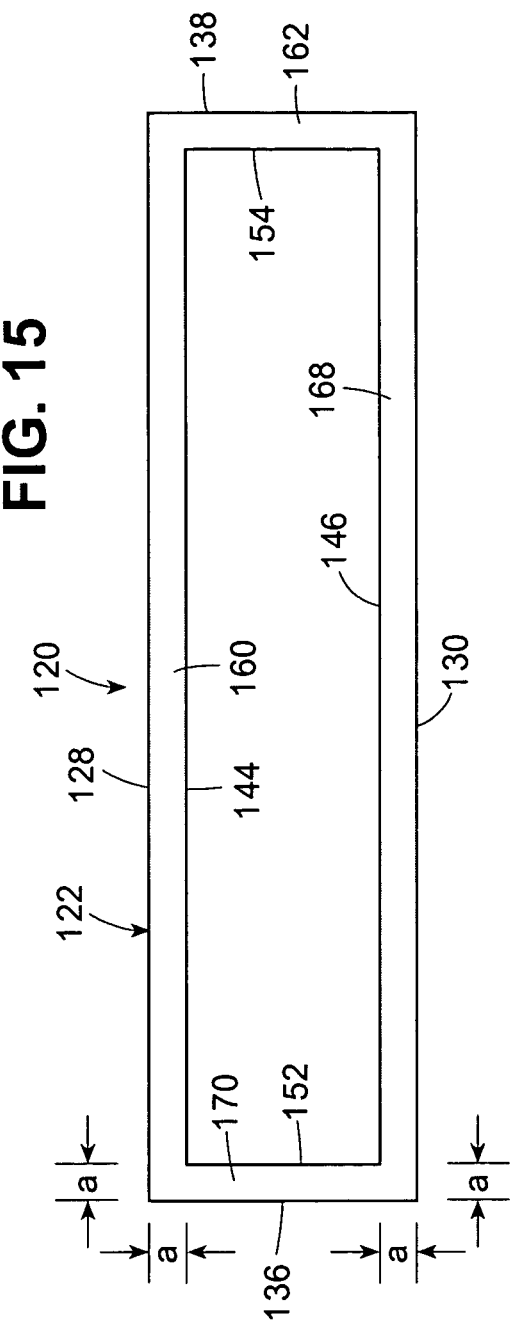
FIG. 15 is a plan view of the packaging system packaging device.

The packaging system 120 includes a one-piece packaging device 122 (FIG. 15) preferably of generally rectangular shape and formed of any suitable known flexible release material such as release paper or releasable plastic that is of a paper thin gauge. A suitable release material is silicone coated paper or equivalent release material.

The packaging device 122 (FIG. 15) has a rectangular outer periphery defined by opposite long side portions 128, 130 and opposite short side portions 136 and 138. The packaging device 122 also has a rectangular inner periphery defined by opposite long side portions 144, 146 and opposite short side portions 152 and 154. The distance between the outer peripheral side portions 128, 130, 136 and 138 and the corresponding inner peripheral side portions 144, 146, 152 and 154 is approximately equivalent to the marginal offset "a" of the L-shaped marginal sections 42 and 58.

The length of the outer long sides 128 and 130 of the device 122 (FIG. 15) is at least equal to the length of any of the long edges 26, 32, 46 and 48 (FIG. 1) of the layers 14 and 16 plus the marginal offset "a" of the L-shaped marginal sections 42 and 58. The length of the outer short sides 136 and 138 (FIG. 15) of the device 122 is at least equal to the length of any of the short edges 34, 40, 50 and 56 (FIG. 1) of the layers 14 and 16 plus the marginal offset "a" of the L-shaped marginal sections 42 and 58.

The length of the inner long sides 144 and 146 of the device 122 (FIG. 15) is approximately equivalent to the length of any of the long edges 26, 32, 46 and 48 (FIG. 1) of the layers 14 and 16 minus the marginal offset "a". The length of the inner short sides 152 and 154 of the device 122 (FIG. 15) is approximately equivalent to the length of any of the outer short edges 34, 40, 50, and 56 (FIG. 1) of the layers 14, 16 and 18 minus the marginal offset "a".

The following reference identifications can be made for the plank 10 and the packaging device 122;

A=the length of any of the long edges 26, 32, 46 and 48 of the layers 14 and 16

B=the length of any of the short edges 34, 40, 50 and 56 of the layers 14 and 16

C=the length of any of the outer long sides 128 and 130 of the device 122

D=the length of any of the outer short sides 136 and 138 of the device 122

E=the length of any of the inner long sides 144 and 146 of the device 122

F=the length of any of the inner short sides 152 and 154 of the device 122 a=the marginal offset of the L-shaped marginal portions 42 and 58

The following relationships between the plank 10 and the packaging device 122 can be expressed in terms of the previous reference identifications as follows, $$C=A+a$$

$$D=B+a$$

$$E=A-a$$

$$F=B-a$$

Figure 14:
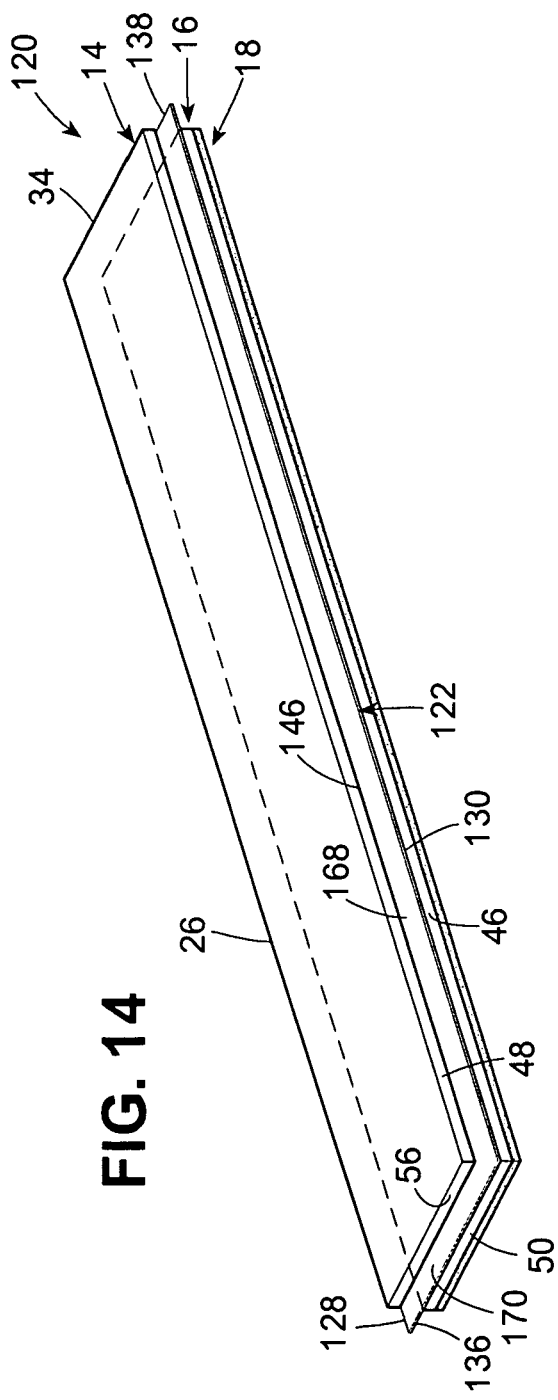

The packaging device 122 is assembled to the floor plank 10 in the manner shown in FIGS. 12, 13 and 14. Thus two intersecting sides 160 and 162 (FIGS. 12 and 15) of the device 122 are placed against the downwardly exposed adhesive surface 72 (FIGS. 1 and 12) of the L-shaped marginal section 42 as shown in FIG. 13, and the remaining two intersecting sides 168, 170 (FIGS. 12 and 15) of the packaging device 122 are placed against the upward exposed adhesive surface 74 (FIG. 1) of the L-shaped marginal section 58.

Under this arrangement the inner long side portion 144 of the device 122 is placed against the long edge 32 of the middle layer 16 and the inner short side portion 154 of the device 122 is placed against the short edge 40 of the middle layer 16. The sides 160 and 162 of the device 122 can thus contact and cover the downwardly exposed adhesive surface 72 of the L-shaped marginal portion 42, as shown in FIG. 13.

After the sides 160 and 162 of the device 122 have been positioned against the downwardly exposed adhesive surface 72 of the L-shaped marginal section 42 the intersecting sides 168 and 170 of the device 122 are moved forward and against the upwardly exposed adhesive surface 74 of the L-shaped marginal section 58 as shown in FIGS. 13 and 14. The inner long side portion 146 of the device 122 (FIG. 12) is thus placed against the long edge portion 48 of the top layer 14 and the inner short side portion 152 of the device 122 is placed against the short edge portion 56 of the top layer 14.

The device 122 can be stretched slightly, if needed, to accomplish the positioning of the sides 160 and 162 of the device 122 against the downwardly exposed adhesive surface 72 and the positioning of the sides 168 and 170 of the device 122 against the upwardly exposed adhesive surface 74.

In this manner the one piece packaging device 122, preferably of closed rectangular periphery, covers all the exposed adhesive surfaces of both L-shaped marginal sections 42 and 58 even though the panel 10 includes one L-shaped marginal section 42 with a downwardly exposed adhesive surface 72 (FIG. 1) and the other L-shaped marginal section 58 has an upwardly exposed adhesive surface 74.

Thus all exposed adhesive surfaces of the floor plank 10, even though they face in opposite directions at different peripheral sections of the plank 10 can be covered and protected with a one piece packaging device 122 until such planks are ready for installation. The packaging device 122 when installed on each of the planks 10 before such planks are ready for use permits the floor planks 10 to be stacked one on top of another (not shown) without one plank 10 adhering to another plank 10. The planks 10 can be stacked for packaging or for display purposes.

Figure 16:
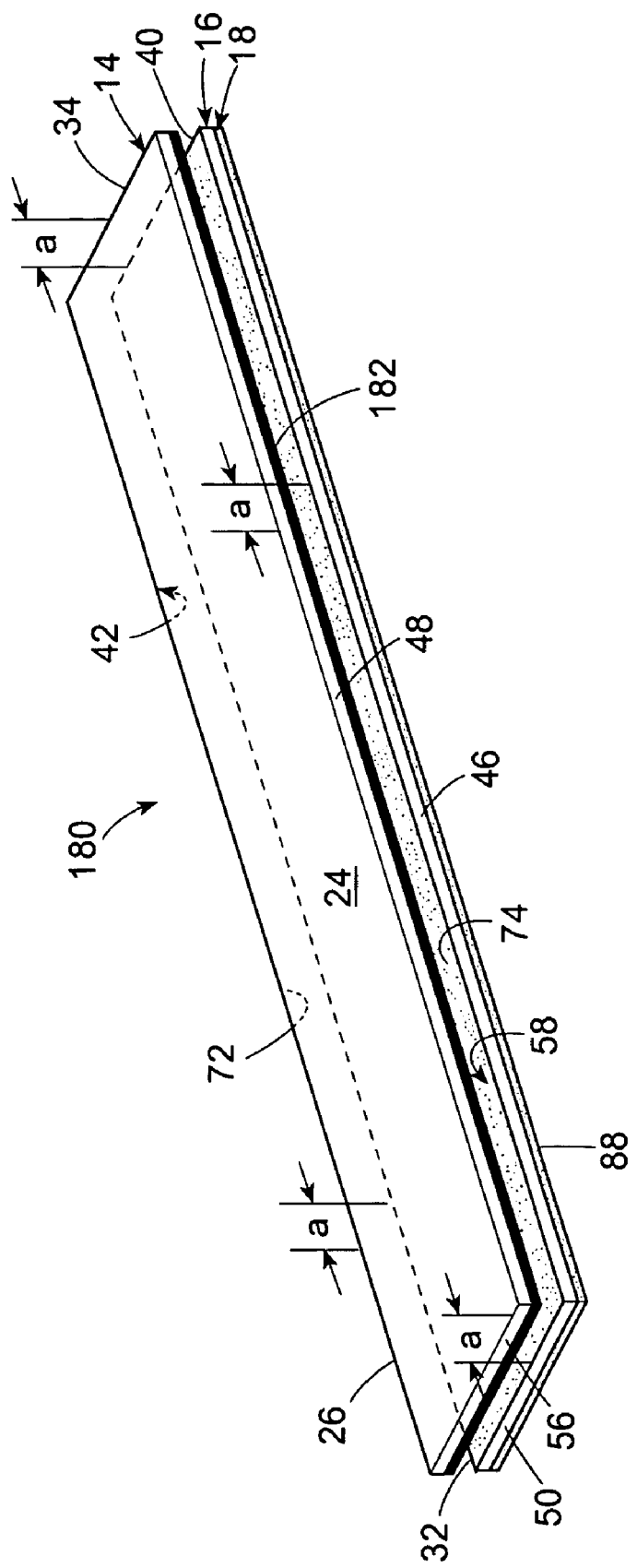
FIG. 16 is a perspective view of a floor plank incorporating a further embodiment of the invention.

A further and preferred embodiment of the floor plank is generally indicated by the reference number 180 in FIG. 16.

The floor plank 180 includes all components of the floor plank 10, with the same marginal offsets as previously described, plus an underlayer 182 of flexible fibrous sheet material sandwiched between the top layer 14 and the middle layer 16. The underlayer 182 provides enhanced dimensional stability to the floor plank 180.

The top layer 14 and the underlayer 182 are coextensive and have a common periphery. Preferably the underlayer 182 is formed of a non-woven glass fiber material such as fiberglass, having a thickness of approximately 0.2 mm.

The top layer 14 and the underlayer 182 are bonded to the middle layer 16 in offset relationship such that floor plank 180 includes the identical L-shaped marginal sections 42 and 58 with identical offsets "a" as previously described for the floor plank 10. The marginal section 42 has the downwardly exposed adhesive surface 72 on the underlayer 182 and the marginal section 58 has the upwardly exposed adhesive surface 74 on the middle layer 16.

The adhesive on the exposed surfaces 72 and 74 is the same adhesive used in the floor plank 10 to bond the top layer 14 to the middle layer 16. Thus the same adhesive is used to bond the underlayer 182 to the top layer 14 and to the middle layer 16, and to bond the middle layer 16 to the bottom layer 18.

The floor plank 180 is installed on a floor in a manner similar to the previously described for the floor plank 10.

As various changes can be made in the above constructions and methods without departing from the scope of the invention, it is intended that all matter contained in the above description or shown in the accompanying drawings shall be interpreted as illustrative and not in a limiting sense.

What is claimed is:

1. A method of covering exposed adhesive portions of a floor plank having two layers of plastic sheet material laminated together in offset relationship such that a first layer has a first marginal portion that is offset from the second layer, and the second layer has a second marginal portion that is offset from the first layer, comprising, covering a first exposed adhesive coated marginal surface of a floor plank that faces a first direction and is at a first perimeter portion of the floor plank, with one continuous strip of flexible releasable material, and covering a second exposed adhesive coated marginal surface of the floor plank that faces a second direction opposite the first direction and is at a second perimeter portion of the floor plank that does not overlap the first perimeter portion of the floor plank, with the one continuous strip of flexible releasable material, whereby both of the oppositely facing first and second adhesive coated marginal surfaces at the first and second non-overlapping perimeter portions of the floor plank are covered with the one continuous strip of flexible releasable material.

2. The method of claim 1 including forming the releasable material with a closed polygonal periphery.

3. The method of claim 1 including forming the releasable material with a rectangular outer periphery and a rectangular inner periphery, and an open inner rectangular space surrounded by the releasable material.

4. The method of claim 1 wherein the releasable material is a silicone coated paper.

5. The method of claim 1 including forming the releasable material as a one piece member.

* * * * *